United States Patent [19]

Stursberg

[11] Patent Number: 5,161,298
[45] Date of Patent: Nov. 10, 1992

[54] APPARATUS FOR SAWING AND DRILLING OF STRUCTURAL SHAPES

[75] Inventor: Bernd Stursberg, Ennepetal, Fed. Rep. of Germany

[73] Assignee: Carl Ullrich Peddinghaus, Wuppertal-Barmen, Fed. Rep. of Germany

[21] Appl. No.: 730,168

[22] Filed: Jul. 16, 1991

[30] Foreign Application Priority Data

Jul. 20, 1990 [DE] Fed. Rep. of Germany ....... 4023125

[51] Int. Cl.⁵ .............................................. B23P 23/00
[52] U.S. Cl. .................................... 29/560; 29/26 A; 83/DIG. 2; 408/26
[58] Field of Search ............ 29/33 R, 560, 26 R, 29/26 A; 408/42, 43, 46, 49, 26; 83/666, DIG. 2, 859

[56] References Cited

U.S. PATENT DOCUMENTS

| | | | |
|---|---|---|---|
| 3,685,915 | 8/1972 | Vierstaete | 29/26 R X |
| 4,736,511 | 4/1988 | Jenkner | 29/560 |
| 4,907,337 | 3/1990 | Krüsl | 29/26 A X |

Primary Examiner—William Briggs
Attorney, Agent, or Firm—Herbert Dubno

[57] ABSTRACT

A combined sawing and drilling machine for structural steel shapes such as I beams has a circular saw unit and the drilling unit mounted on a common plate or on respective plates on a common foundation adjacent one another so that the clamping screw for replacement of the blade is actuated through a window or opening in the plate carrying the drill units, thereby allowing the drilling unit and the saw to be disposeed closer together when the roller conveyor is equipped with only one position-measuring unit and thereby reducing cut-off waste.

4 Claims, 5 Drawing Sheets

APPARATUS FOR SAWING AND DRILLING OF STRUCTURAL SHAPES

FIELD OF THE INVENTION

My present invention relates to an apparatus for the sawing and drilling of structural steel shapes and, more particularly, to an apparatus in which a structural steel shape, for example, an I beam, is displaceable on a roller conveyor, has its displacement measured by a measuring device and is provided with a saw and drill bits displaceable in at least two mutually perpendicular directions for shaping the workpiece. The shaping of the workpiece may involve cutting it to size or cutting out portions of the beam or girder and drilling holes therein to receive bolts or rivets for attaching the beam or girder to connecting plates and/or other beams or girders in a steel construction.

BACKGROUND OF THE INVENTION

The reference to "structural shapes" and to "structural steel shapes" is intended to encompass I beams, H beams, angles, channels, bar stock and even circular stock which may be used in construction, i.e. steel profiles or members of various cross sectional shapes which are generally elongated and are referred to in construction as beams or girders.

In working with such structural shapes, it is frequently necessary to cut the workpiece to length, to cut out a portion of the workpiece and to drill the workpiece with bores which may accommodate bolts or rivets for attachment to connecting plates or the attachment of one beam to another, in the erection of a structure or assembly of the beams into prefabricated structural units which may be erected at the building site.

For the cutting of such beams (see the Peddinhaus publication of the assignee hereof entitled "Peddimat-Anlagen fur den Stahlbau", 1-IX/89 FMD), sawing apparatus can be provided in conjunction with a roller conveyor, the beam being fed on rollers of that conveyor upstream and downstream of a saw blade which can be moved downwardly into the workpiece and which is rotated about an axis which can be parallel to the longitudinal dimension of the workpiece. The saw blade can lie in a vertical plane when the beams are horizontally transported.

The circular saw blade is removably mounted on a shaft stub of the sawing machine and this shaft stub can be raised or lowered and, if desired, can be swingable to displace the blade. The means for mounting the blade on the shaft stub can include at least one clamping bolt or screw and a clamping plate cover or washer which is held by the head of the bolt against the blade.

As described in the aforementioned publication, the saw can be closely juxtaposed with the drilling unit which can have a drilling head for forming mutually perpendicular holes in the workpiece so that the unit can drill both holes in the flange or flanges of the workpiece and holes in the web or webs thereof, or selectively can drill such holes.

When the combined machine of this type is provided, i.e. the machine has a single conveyor and a single machining device for machining the position of the workpiece and both a sawing unit and a drilling unit as described, it is desirable to provide the drilling unit as close as possible to the sawing unit. However, the sawing unit requires a certain free space to enable mounting and dismounting of the blade for blade replacement. This free space must be sufficient to allow withdrawal of the clamping bolt from the shaft stub.

In the system described in the aforementioned publication, the sawing machine on the one hand and the drilling unit on the other are effectively independent machines which are provided close together on separate foundations or bases. While, in general, this provides a spacing between the clamping cover of the saw and the drilling unit which is greater than the requisite mounting free space, it is not possible in this construction to move the drilling unit and sawing machine closer together in any event since the minimum clearance must be this free space.

The circular saw blade, however, of the sawing machine is subject to considerable wear in use and must be changed from time to time with a minimum of difficulty. Furthermore, it is highly advantageous to be able to use a single roller measuring unit, i.e. a measuring unit ascertaining the position of the beam or girder based upon rotation of a roller in contact with the girder (see the aforementioned publication). As a consequence of the mounting free space required and the desire to use a single measuring device, there is a portion of the workpiece, i.e. the beam or girder which extends beyond that which can be effectively processed in response to the measurement. This length of the girder, which represents a section thereof to be discarded, is usually cut off as waste. The length of this waste section will depend upon the spacing of the saw from the drilling unit.

It will be understood that this waste is a result of the fact that a free end of the girder must continue to be in engagement with the roller measuring device when operations of the saw and drills are effected in the region of this end. If the waste section can be shortened, the workpiece can be utilized more fully.

OBJECTS OF THE INVENTION

It is, therefore, the principal object of the present invention to provide an apparatus for the purposes described in which the distance between the saw and the drilling units can be substantially reduced and thus the length of the waste section of the workpiece ca also be greatly reduced.

Another object of the invention is to provide an apparatus for the combined sawing and drilling of structural steel shapes which is free from drawbacks of earlier systems.

Still another object of this invention is to provide an apparatus for the drilling and cut of structural steel shapes which reduces waste and nevertheless allows rapid replacement of a circular saw blade of the sawing machine.

SUMMARY OF THE INVENTION

These objects, and others which will become more readily apparent hereinafter, are attained in accordance with the invention by providing the drilling unit (comprising at least two mutually perpendicular drill bits for drilling the flanges and web of the beam) and the saw (with its replaceable circular saw blade) on a single foundation or base adjacent to one another such that the spacing of the clamping cover of the saw, i.e. the member which retains the saw blade on its shaft stub, is less than the mounting free space for the clamping bolt, the machine body plate upon which the drilling unit is affixed having a mounting cut-out or window through which the clamping screw of the clamping cover can be actuated for replacement of the circular saw blade upon raising of the shaft stub into alignment with this window. One of the drilling units can be displaceable across this window if desired and, of course, will be moved out of the way for replacement of the circular saw blade.

It will be appreciated that the invention substitutes for the prevailing concept of providing a free space between the saw blade and the drilling unit sufficient to back out the bolt, with the provision of a mounting plate having a window, cut-out or opening through which the screw can be backed out and which can carry the drilling unit so that it is thus possible to provide the drilling unit much closer to the saw blade than has hitherto been the case. Upon removal of the screw through the window or opening, the saw blade can be raised from the machine. The spacing, indeed, can be substantially less than the aforementioned mounting free space and the distance through which the bolt is backed out.

According to a feature of the invention, the sawing unit and the drilling units are mounted upon a single mounting plate which extends upwardly from the foundation or base and on one side of which the drilling units and the opposite side of which the sawing unit can be affixed via a bridge structure on which the stub shaft is journaled. The window can be formed in the upper half of this plate. It is, however, possible, according to the invention, to provide the drilling units and the sawing unit on separate plates which can be provided back to back on the same foundation or base, or otherwise, the mounting plate carrying the drilling units having the mounting window in its upper half.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
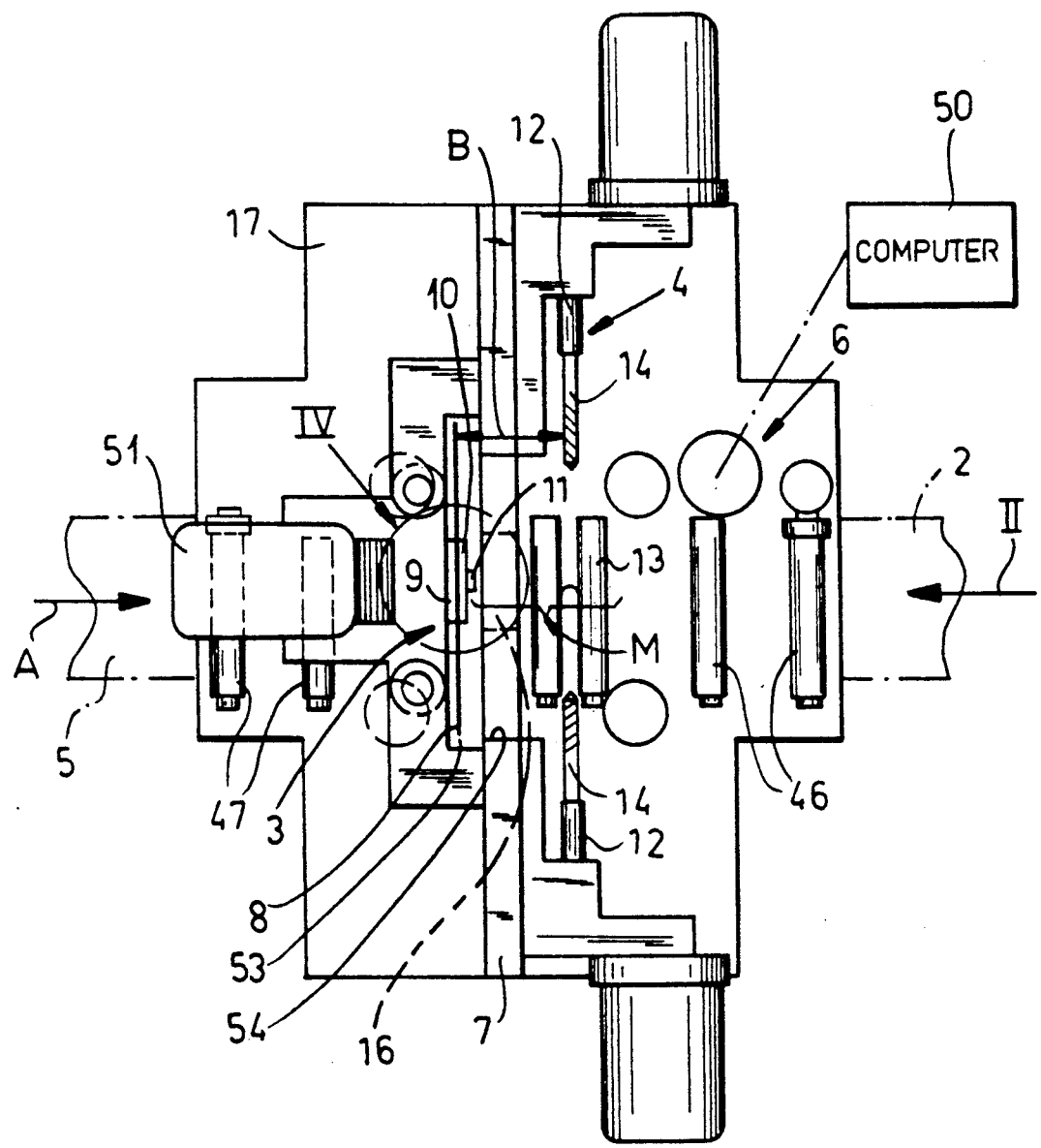
FIG. 1 is a diagrammatic plan view of the apparatus of the invention according to one embodiment thereof.

In FIG. 1-4 I have shown an apparatus for the machining of structural steel shapes such as the I beam or girder 1 (see FIGS. 2 and 3), by a sawing operation and by drilling operations. For example the I beam 1 can have a web 1a and two flanges 1b and 1c, all of which may be drilled by drill bits 14 in respective boring heads 12 which can have drive motors 40 and can be equipped with devices 41 which may have servomotors having lead screws 42 for raising and lowering the drilling heads. The latter may be guided on rails 43 for vertical movement and can be equipped with means, not shown, for moving the drilling bit toward and away from the workpiece. The vertical drilling head 12 can be equipped with a similar motor 44 and lead screw 45 for horizontally moving this drilling head. The means for vertically moving this drill bit cannot be seen in the drawing.

In addition, the apparatus is equipped for the sawing of the workpiece and for that purpose a circular saw blade 8 may be provided.

Figure 2:
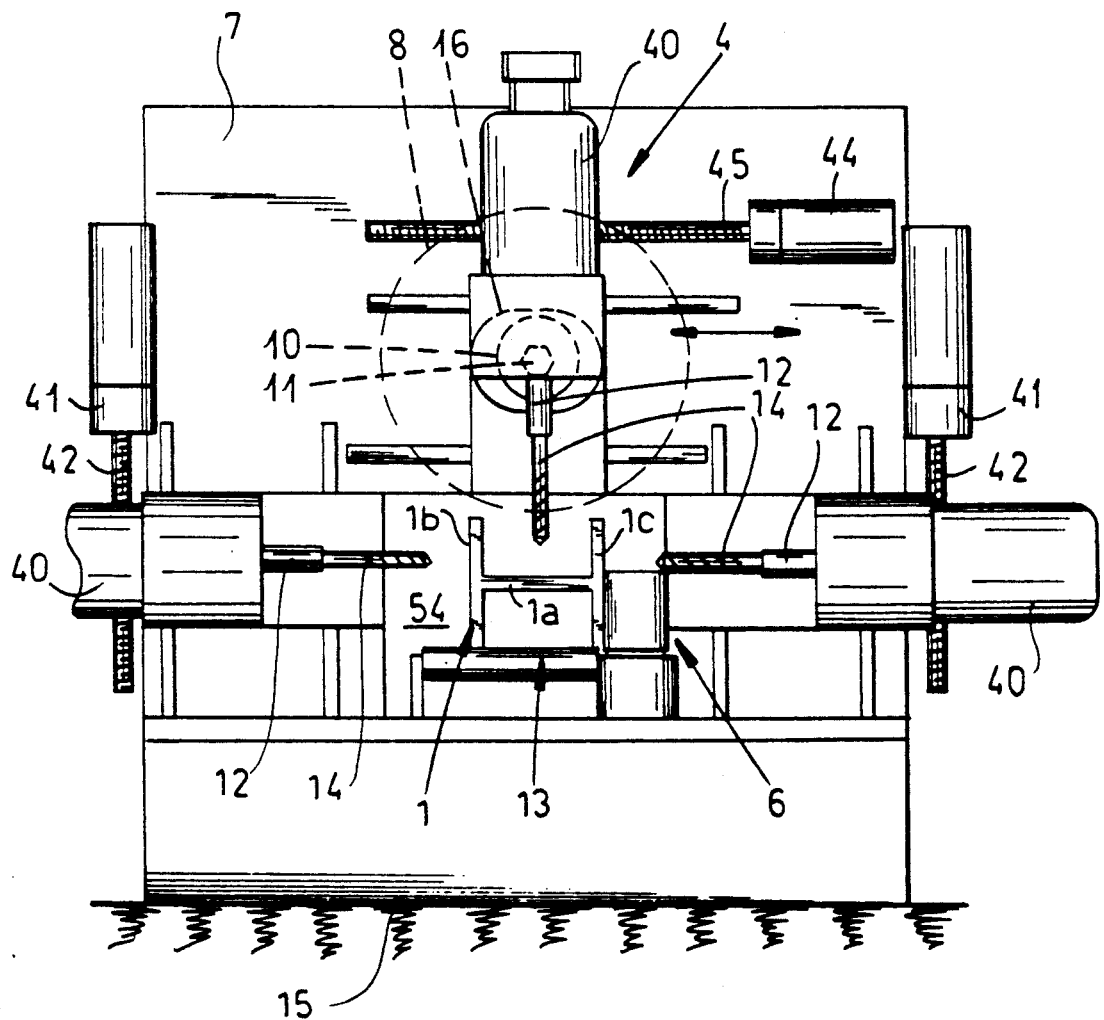
FIG. 2 is a view in the direction of arrow II of FIG. 1.
Figure 3:
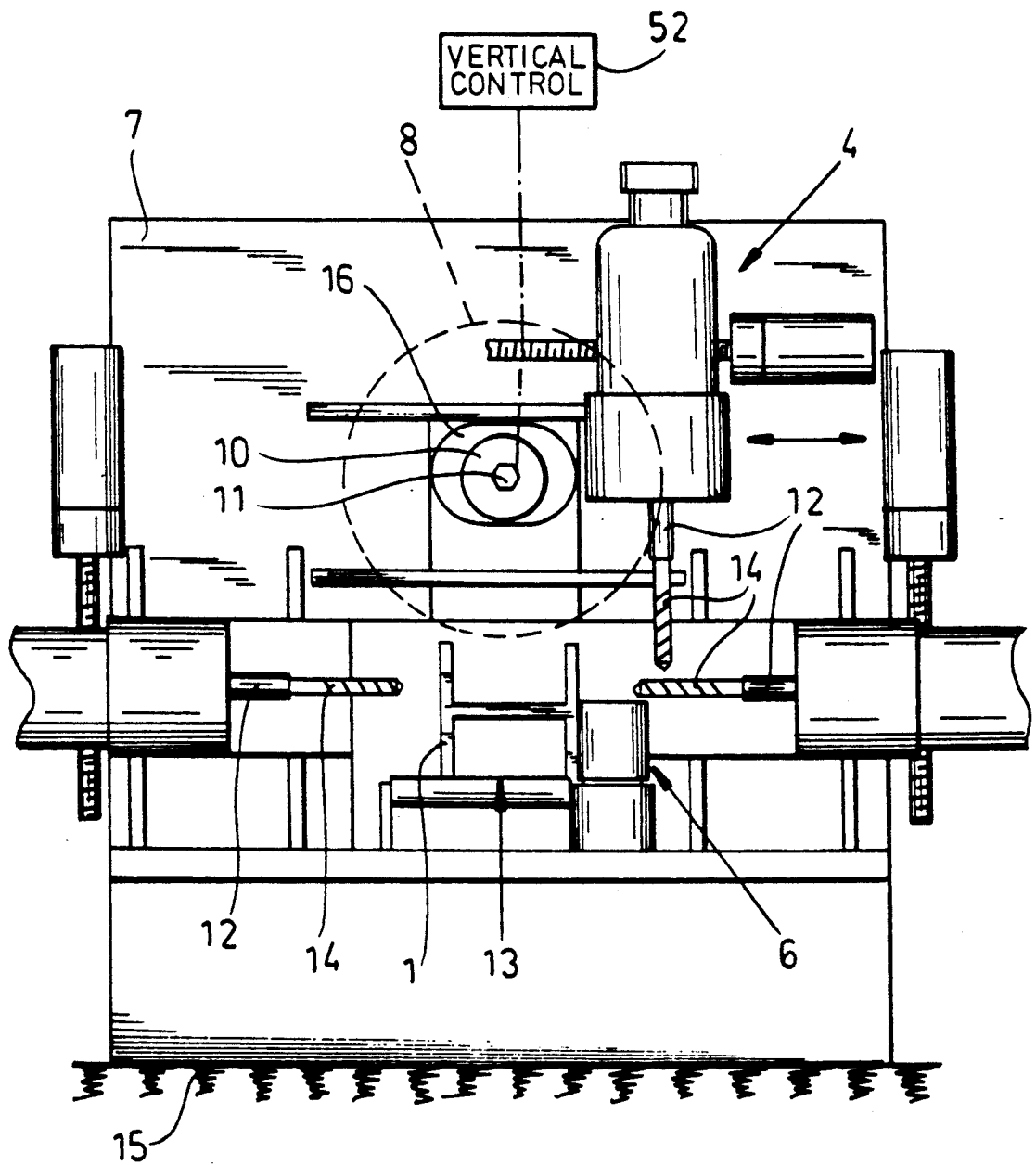
FIG. 3 is a view similar to FIG. 2 with the parts thereof in another position.
Figure 4:
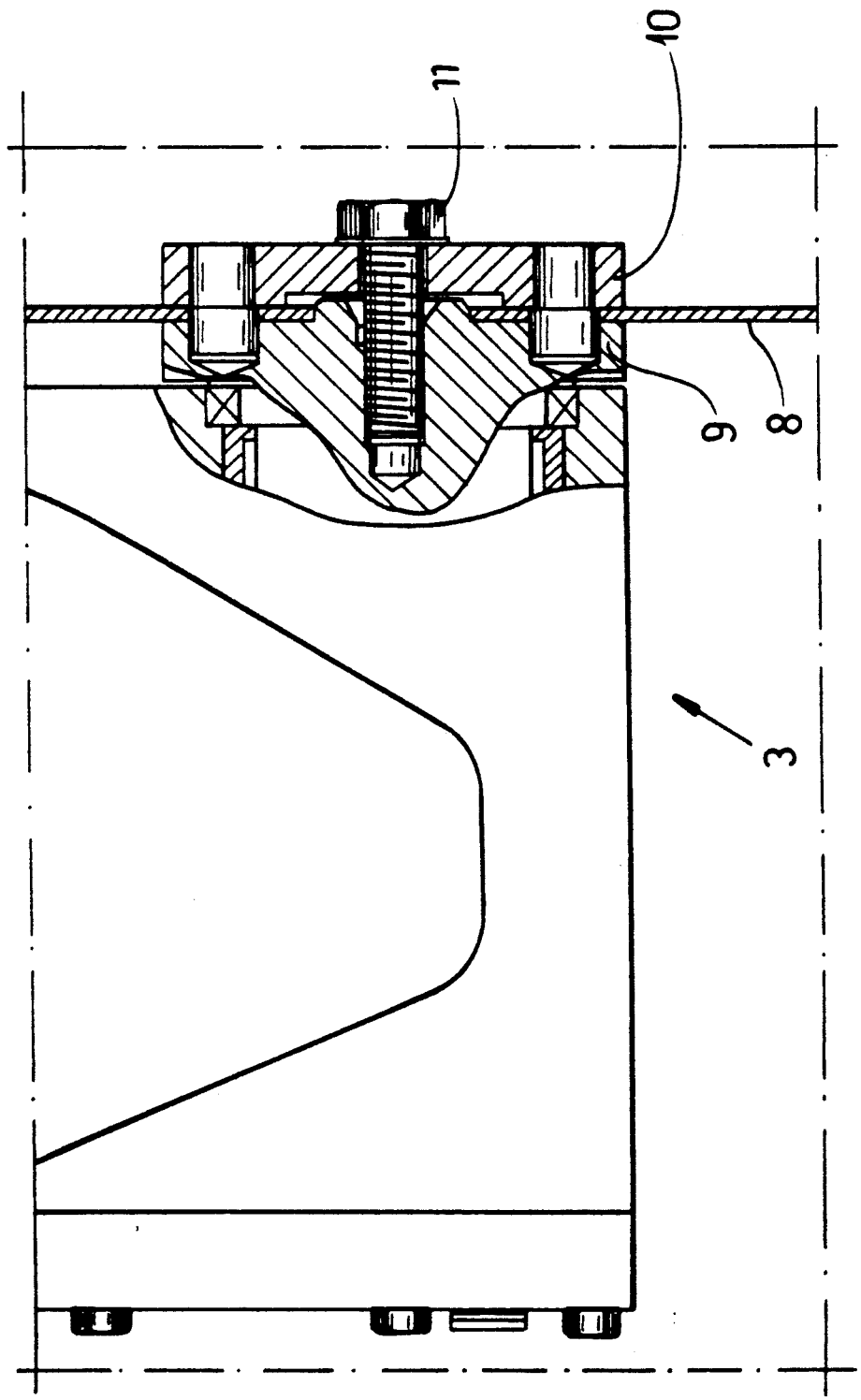
FIG. 4 is an enlarged detail view of the region IV of FIG. 1, partly broken away.

The basic elements of the apparatus comprise a feed roller conveyor generally represented at 2 and including the rollers 46 and a discharge roller conveyor 5 including the rollers 47 upon which the girder can rest (see also FIG. 2 and FIG. 3). The sawing machine or unit is represented at 3 and the drilling units of the drilling machine are represented collectively at 4. The roller conveyor path 2, 5 through the machine has a single roller measurement unit 6 for determining the position of the girder or beam 1 in the apparatus. The unit 6 can feed a machine-control computer 50 as represented in FIG. 1 and the principles of which have been described in the aforementioned publication.

The sawing machine 3 and the drilling machine 4 are disposed one behind the other in the direction of travel of the girder 1 as represented by the arrow A in FIG. 1 and are fixed to a common mounting plate 7 of the machine on one side and the opposite side thereof.

The blade 8 of the sawing machine 3 is replaceable and is mounted on a vertically shiftable, i.e. raisable and lowerable shaft stub 9 which is driven by a motor 51. The means for raising and lowering the saw blade and the shaft stub is not visible structurally in FIGS. 1-3 and thus has been illustrated as a box 52 labelled vertical control in FIG. 3. The shaft stub 9 may also be swingable, if desired, on the bridge structure 17 connecting it to the plate 7.

The circular saw blade is mounted on the shaft stub 9 (FIG. 4) with the aid of a clamping cover or plate 10 and at least one clamping screw or bolt 11. The withdrawal of the screw 11 requires a certain mounting free space which, for the sake of illustration, has been represented at M in FIG. 1, i.e. sufficient space to enable the screw to be withdrawn from the shaft stub and the blade to be withdrawn upwardly from the clearance 53 between the bridge 17 and the plate 7.

The drilling units, as noted, comprise at least two mutually orthogonal displaceable drilling heads 12 located along side clearance 54 in the mounting plate 7 through which the beam 1 can pass.

From FIGS. 1 and 2 it will be apparent that the drilling machine 4 and the sawing machine 3 are mounted adjacent one another on a single foundation or base 15. The distance A of the clamping plate 10 of the saw from the drilling machine 4 is less than the mounting free space M of the bolt 11.

According to the invention, the plate 7 is formed at its upper half with a window, opening or space 16 through which the clamping bolt 11 can be manipulated for removal and insertion of this bolt on a saw blade change. By comparing FIGS. 2 and 3, it can be seen that the upper drilling head 12 can be shifted laterally to one side or the other to clear the window 16. Other drilling heads may be shifted similarly and the shiftability allows the assumption of special drilling positions.

In the embodiment of FIGS. 1 and 2, a single mounting plate 7 is provided and extends upwardly from the base 15. On one side of this plate are provided the drilling heads 12 while the other side carries the saw blade via the bridge arrangement 17 upon which the shaft stub 9 is journaled.

Figure 5:
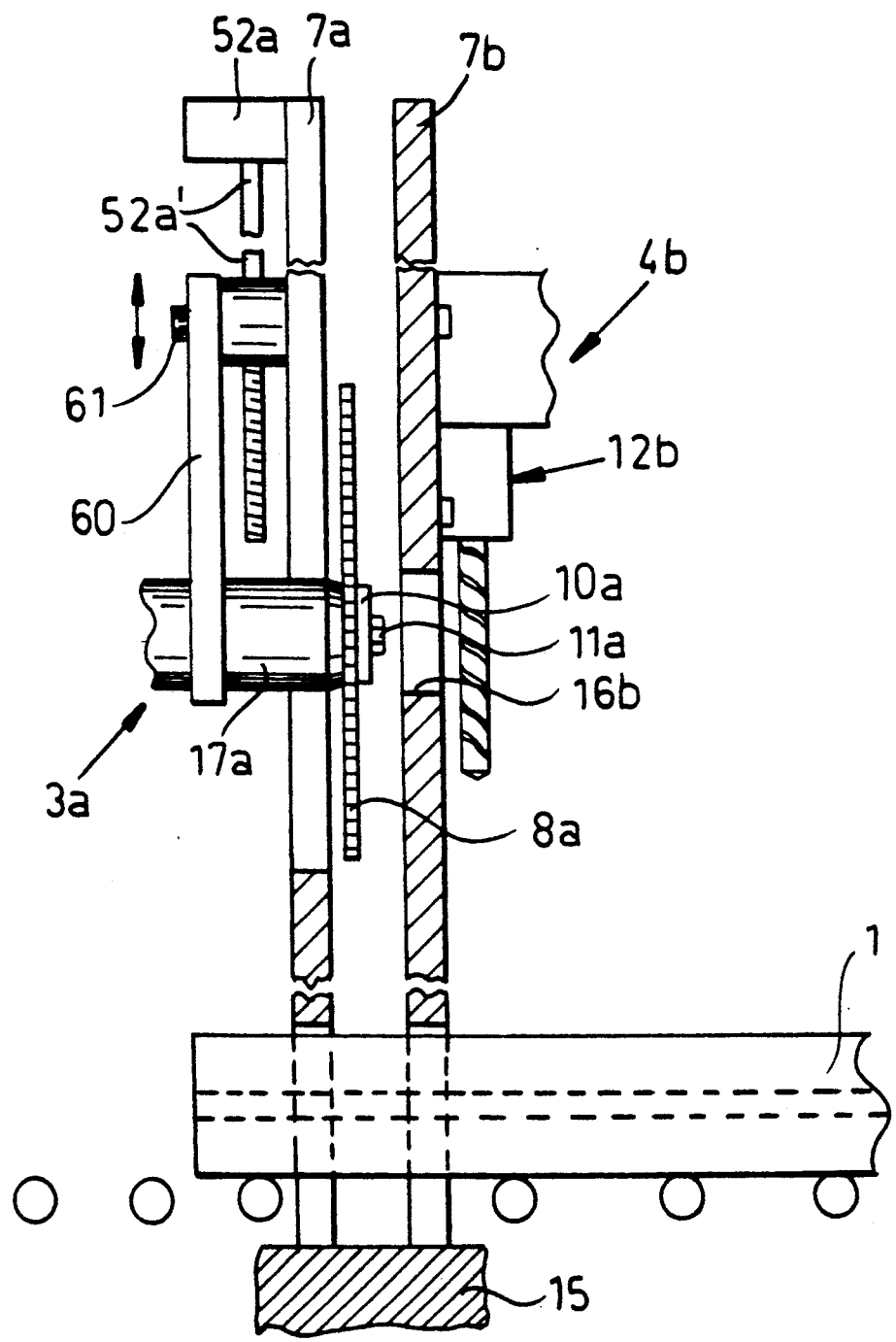
FIG. 5 is a diagrammatic vertical section of a system using two mounted plates in another embodiment of the invention.

In the embodiment of FIG. 5, however, separate mounting plates 7a and 7b are provided for the saw unit 3a and the drilling units 4b. Here the stub shaft journal 17a carrying the saw blade 8a, the clamping screw 11a and the clamping plate 10a may be swingable on an arm 60 about a pivot 61. The means for raising and lowering the blade are represented here as a servomotor 52a and its lead screw 52a'. The two plates 7a, 7b are mounted upon the common foundation or base 15 and the upper half of the plate 7b is provided with the window 16b through which the screw 11a can be manipulated. Only one of the drilling heads 12b has been illustrated in FIG. 5.

I claim:

1. An apparatus for the drilling and sawing of structural steel shapes, comprising:
   conveyor means for displacing a structural steel shape to be cut and drilled;
   a sawing machine positioned along said conveyor means, said sawing machine comprising a shaft stub, a blade replaceably mounted on said shaft stub, a clamping plate lying against said blade, a clamping screw traversing said clamping plate and said blade and threaded into said shaft stub for securing said blade detachably on said shaft stub, said clamping screw having a predetermined length that determines a mounting free space adjacent the head of said clamping screw;
   a drilling machine adjacent said sawing machine and having a mounting plate carrying a plurality of drilling heads including at least two mutually orthogonal drilling heads for drilling a structural steel shape on said conveyor means, said drilling machine being located close to said clamping plate and within said mounting free space, said mounting plate being formed at an upper portion thereof with a window alignable with said clamping plate and clamping screw and through which said clamping screw can be manipulated for replacement of said saw blade;
   a single roller measuring unit along said conveyor means effective for both of said machines for measuring a position of said structural steel shape on said conveyor means; and
   a common base for said sawing machine and said drilling machine.

2. The apparatus defined in claim 1 wherein said mounting plate forms a single mounting plate extending upwardly from said base and carrying said sawing machine on one side and said drilling heads on an opposite side of said mounting plate, said window being located at an upper half of said mounting plate.

3. The apparatus defined in claim 1 wherein two mounting plates are provided, one of said mounting plates carrying said drilling heads, the other of said mounting plates carrying said sawing machine, said one of said mounting plates being provided with said window at an upper half thereof, both of said mounting plates extending upwardly from said base.

4. The apparatus defined in claim 1, further comprising means for raising and lowering said shaft stub, whereby said shaft stub can be raised to an upper position wherein said screw is in line with said window.

* * * * *